(12) United States Patent
Khatravath et al.

(10) Patent No.: US 10,043,146 B2
(45) Date of Patent: Aug. 7, 2018

(54) METHOD AND DEVICE FOR ESTIMATING EFFICIENCY OF AN EMPLOYEE OF AN ORGANIZATION

(71) Applicants: Sreevidya Khatravath, Hyderabad (IN); Manikhantan Sanakara Raman, Chennai (IN); Abhishek Suman, Bihar Sharif (IN)

(72) Inventors: Sreevidya Khatravath, Hyderabad (IN); Manikhantan Sanakara Raman, Chennai (IN); Abhishek Suman, Bihar Sharif (IN)

(73) Assignee: WIPRO LIMITED, Bangalore (IN)

( * ) Notice: Subject to any disclaimer, the term of this patent is extended or adjusted under 35 U.S.C. 154(b) by 512 days.

(21) Appl. No.: 14/671,043

(22) Filed: Mar. 27, 2015

(65) Prior Publication Data
US 2016/0239782 A1     Aug. 18, 2016

(30) Foreign Application Priority Data

Feb. 12, 2015 (IN) .............................. 691/CHE/2015

(51) Int. Cl.
*G06Q 10/00* (2012.01)
*G06Q 10/06* (2012.01)

(52) U.S. Cl.
CPC .............................. *G06Q 10/06398* (2013.01)

(58) Field of Classification Search
CPC .......... G06Q 10/00–50/00; G06K 1/00–21/00; G06T 1/00–19/00
USPC ................................................ 705/7.11–7.42
See application file for complete search history.

(56) References Cited

U.S. PATENT DOCUMENTS

| | | | | |
|---|---|---|---|---|
| 4,413,277 A | * | 11/1983 | Murray ............ | G06Q 10/06398 348/86 |
| 5,212,635 A | * | 5/1993 | Ferriter ............ | G06Q 10/06398 340/309.7 |
| 5,666,157 A | * | 9/1997 | Aviv ................ | G08B 13/19602 348/150 |
| 5,969,755 A | * | 10/1999 | Courtney ............ | G06F 17/3079 348/135 |
| 6,188,777 B1 | * | 2/2001 | Darrell ............... | G06K 9/00362 348/169 |

(Continued)

OTHER PUBLICATIONS

Gong, Jie, and Carlos H. Caldas. "An object recognition, tracking, and contextual reasoning-based video interpretation method for rapid productivity analysis of construction operations." Automation in Construction 20.8 (2011): 1211-1226. (Year: 2011).*

(Continued)

*Primary Examiner* — Alan S Miller
(74) *Attorney, Agent, or Firm* — Finnegan, Henderson, Farabow, Garrett & Dunner LLP

(57) ABSTRACT

The present disclosure relates to a method and device for estimating efficiency of an employee of an organization. In one embodiment, the input data is received from one or more data sources. The input data is classified into one of location data, video data, voice data and text data of the employee. Using the location data and the video data, the trajectory information of the employee is generated. The trajectory information, the voice data and the text data are correlated. Based on the correlation, the efficiency of the employee is estimated.

17 Claims, 5 Drawing Sheets

(56) References Cited

U.S. PATENT DOCUMENTS

| | | | | |
|---|---|---|---|---|
| 6,236,736 | B1* | 5/2001 | Crabtree | G01S 3/7865 235/383 |
| 7,272,461 | B2* | 9/2007 | Yoshikawa | G07C 1/10 348/143 |
| 7,543,744 | B2* | 6/2009 | Hart | G06Q 10/06 235/385 |
| 7,664,292 | B2* | 2/2010 | van den Bergen | G06K 9/00771 348/152 |
| 7,864,980 | B2* | 1/2011 | Evans | G06K 9/00771 348/154 |
| 7,957,565 | B1* | 6/2011 | Sharma | G06K 9/00778 382/103 |
| 8,013,738 | B2* | 9/2011 | Donovan | G08B 13/19645 340/506 |
| 8,253,792 | B2* | 8/2012 | Wells | H04N 7/181 348/152 |
| 8,280,153 | B2* | 10/2012 | Cobb | G06T 11/206 382/103 |
| 8,354,926 | B2* | 1/2013 | Donovan | G08B 13/19645 340/506 |
| 8,364,504 | B1* | 1/2013 | Bleser | G06F 19/326 705/2 |
| 8,364,509 | B1* | 1/2013 | Marr | G06Q 10/0639 705/320 |
| 8,380,558 | B1* | 2/2013 | Sharma | G06Q 30/02 348/69 |
| 8,548,203 | B2* | 10/2013 | Bobbitt | G06K 9/00771 382/107 |
| 8,589,114 | B2* | 11/2013 | Papadourakis | A63B 69/00 473/223 |
| 8,612,286 | B2* | 12/2013 | Bobbitt | G06Q 10/063114 348/150 |
| 8,694,352 | B1* | 4/2014 | Hawkins | G06Q 10/06 705/7.15 |
| 8,711,217 | B2* | 4/2014 | Venetianer | G06F 17/3079 348/143 |
| 9,158,995 | B2* | 10/2015 | Rodriguez-Serrano | G06K 9/6217 |
| 9,257,150 | B2* | 2/2016 | Hurst | G11B 27/34 |
| 9,342,806 | B2* | 5/2016 | Urban | G06Q 10/063114 |
| 9,344,616 | B2* | 5/2016 | Donovan | G08B 13/19645 |
| 9,566,004 | B1* | 2/2017 | Radwin | A61B 5/1118 |
| 9,609,348 | B2* | 3/2017 | Shi | H04N 19/52 |
| 2002/0114493 | A1* | 8/2002 | McNitt | A61B 5/1124 382/107 |
| 2003/0053658 | A1* | 3/2003 | Pavlidis | G06K 9/00335 382/103 |
| 2004/0130620 | A1* | 7/2004 | Buehler | G06K 9/00335 348/143 |
| 2005/0146605 | A1* | 7/2005 | Lipton | G06F 17/3079 348/143 |
| 2005/0273381 | A1* | 12/2005 | Thomas | G06Q 10/00 705/7.42 |
| 2006/0104479 | A1* | 5/2006 | Bonch-Osmolovskiy | G06K 9/00355 382/103 |
| 2006/0199167 | A1* | 9/2006 | Yang | G06F 17/5009 434/365 |
| 2006/0270421 | A1* | 11/2006 | Phillips | G08B 21/0236 455/457 |
| 2007/0058040 | A1* | 3/2007 | Zhang | G06K 9/00771 348/150 |
| 2007/0182818 | A1* | 8/2007 | Buehler | G08B 13/19602 348/143 |
| 2007/0279494 | A1* | 12/2007 | Aman | G01S 3/7864 348/169 |
| 2008/0086290 | A1* | 4/2008 | Wilson | G06F 8/20 703/6 |
| 2009/0070163 | A1* | 3/2009 | Angell | G06Q 10/04 705/7.26 |
| 2009/0099892 | A1* | 4/2009 | Iijima | G06F 17/3089 705/16 |
| 2009/0271243 | A1* | 10/2009 | Sholl | G06Q 30/018 434/365 |
| 2009/0292581 | A1* | 11/2009 | Omiya | G06Q 10/06 705/7.14 |
| 2010/0324964 | A1* | 12/2010 | Callanan | G06Q 10/06 705/322 |
| 2011/0044498 | A1* | 2/2011 | Cobb | G06T 11/206 382/103 |
| 2011/0128388 | A1* | 6/2011 | Pai | G01L 311/03 348/187 |
| 2011/0215911 | A1* | 9/2011 | Cassels | G01K 7/01 340/10.4 |
| 2011/0302003 | A1* | 12/2011 | Shirish | G06Q 10/105 705/7.38 |
| 2011/0320389 | A1* | 12/2011 | Donovan | G08B 13/19645 706/12 |
| 2012/0245980 | A1* | 9/2012 | Cook | G06Q 10/04 705/7.37 |
| 2013/0027561 | A1* | 1/2013 | Lee | G06Q 30/02 348/150 |
| 2013/0110565 | A1* | 5/2013 | Means, Jr. | G06Q 10/063 705/7.11 |
| 2013/0275187 | A1* | 10/2013 | Patel | G06Q 10/06398 705/7.42 |
| 2013/0308922 | A1* | 11/2013 | Sano | H04N 21/4316 386/245 |
| 2014/0032280 | A1* | 1/2014 | Etchegoyen | G06Q 10/06398 705/7.42 |
| 2014/0035726 | A1* | 2/2014 | Schoner | G06K 7/10366 340/8.1 |
| 2014/0278629 | A1* | 9/2014 | Stephenson | G06Q 10/1091 705/7.13 |
| 2015/0142154 | A1* | 5/2015 | Tiano | G05B 19/4065 700/109 |
| 2015/0206081 | A1* | 7/2015 | Lee | G06Q 30/02 705/7.13 |

OTHER PUBLICATIONS

Han, SangUk, and SangHyun Lee. "A vision-based motion capture and recognition framework for behavior-based safety management." Automation in Construction 35 (2013): 131-141. (Year: 2013).*

Vijayanarasimhan, Sudheendra, and Kristen Grauman. "Active frame selection for label propagation in videos." European Conference on Computer Vision. Springer, Berlin, Heidelberg, 2012. (Year: 2012).*

* cited by examiner

METHOD AND DEVICE FOR ESTIMATING EFFICIENCY OF AN EMPLOYEE OF AN ORGANIZATION

CROSS-REFERENCE TO RELATED APPLICATION

This U.S. patent application claims priority under 35 U.S.C. § 119 to: Indian Patent Application No. 691/CHE/2015, filed Feb. 12, 2015. The aforementioned application is incorporated herein by reference in its entirety.

TECHNICAL FIELD

The present subject matter is related, in general to employees of an organization and more particularly, but not exclusively to a method and a device for estimating efficiency of employees in the organization.

BACKGROUND

In organizations where many employees work, it is difficult to determine accurately the productivity of all the employees with respect to effective working hours of the employee. Radio Frequency Identification (RFID) access systems, biometric attendance systems, network logs of employee do partial job of understanding the productivity of employee. Further, for rating the employee the manual reference of manager is considered. But the manager may not consider the entire year projects, efforts put in by the employee each day/month/quarter. There is no mechanism to understand the time invested by employee in the project work, meetings, problems faced during projects, resolution of problems, etc. during the project which helps in understanding employee's efforts during the work. Even the time sheet/work status updates provided by the employee may not reflect the actual efforts of the employee.

At present, the organizations use the security systems like RFID, Biometric etc. for estimating efficiency of the employee. The security systems do not indicate the actual time invested by the employee towards the work. There is no technique to automatically determine the actual amount of time the employee dedicates towards work. The current systems do not understand the time invested by employee in different activities during a project such as meetings, proposal, architecture design, and development, resolving problems in the project, time for delivery of project, missing interim deadlines or final deadline. Therefore, it is not accurate to rely only on a single data point like RFID or employee login details to determine effectiveness or productivity of the employee.

The issues mainly faced while determining the employee productivity at real-time are to track all the activities of the employees accurately, to correlate the different data points for estimating the efficiency and to provide recommendations based on the estimated efficiency.

SUMMARY

Disclosed herein is a method and device for estimating efficiency of an employee of an organization. The device receives input data i.e location data, video data, voice data and text data of the employee from one or more data sources. The device correlates the input data and determines the efficiency of the employee based on the correlation.

Accordingly, the present disclosure relates to a method for estimating efficiency of an employee of an organization. The method comprises receiving input data from one or more data sources. Upon receiving the input data, the method classifies the input data into one of location data, video data, text data and voice data of the employee. The method further comprises generating trajectory information of the employee using the location data and the video data. Upon generating the trajectory information, the text data, trajectory information and the voice data are correlated. Finally, the efficiency of the employee is estimated based on the correlation.

Further, the present disclosure relates to a device for estimating efficiency of an employee of an organization. The system comprises a processor and a memory communicatively coupled to the processor, wherein the memory stores processor-executable instructions, which, on execution, cause the processor to receive, input data from one or more data sources. The processor is further configured to classify the input data into one of location data, video data, voice data and text data of the employee and generate trajectory information of the employee using the location data and the video data. The processor is furthermore configured to correlate the trajectory information, text data and the voice data and estimate the efficiency of the employee based on the correlation.

Furthermore, the present disclosure relates to a non-transitory computer readable medium including instructions stored thereon that when processed by at least one processor cause a system to perform the act of receiving input data from one or more data sources. Further, the instructions cause the processor to classify the input data into one of location data, video data, voice data and text data of the employee and generate trajectory information of the employee using the location data and the video data. Further, the instructions cause the processor to correlate the trajectory information, voice data and the text data and estimate the efficiency of the employee based on the correlation.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which:

DETAILED DESCRIPTION

Figure 1:
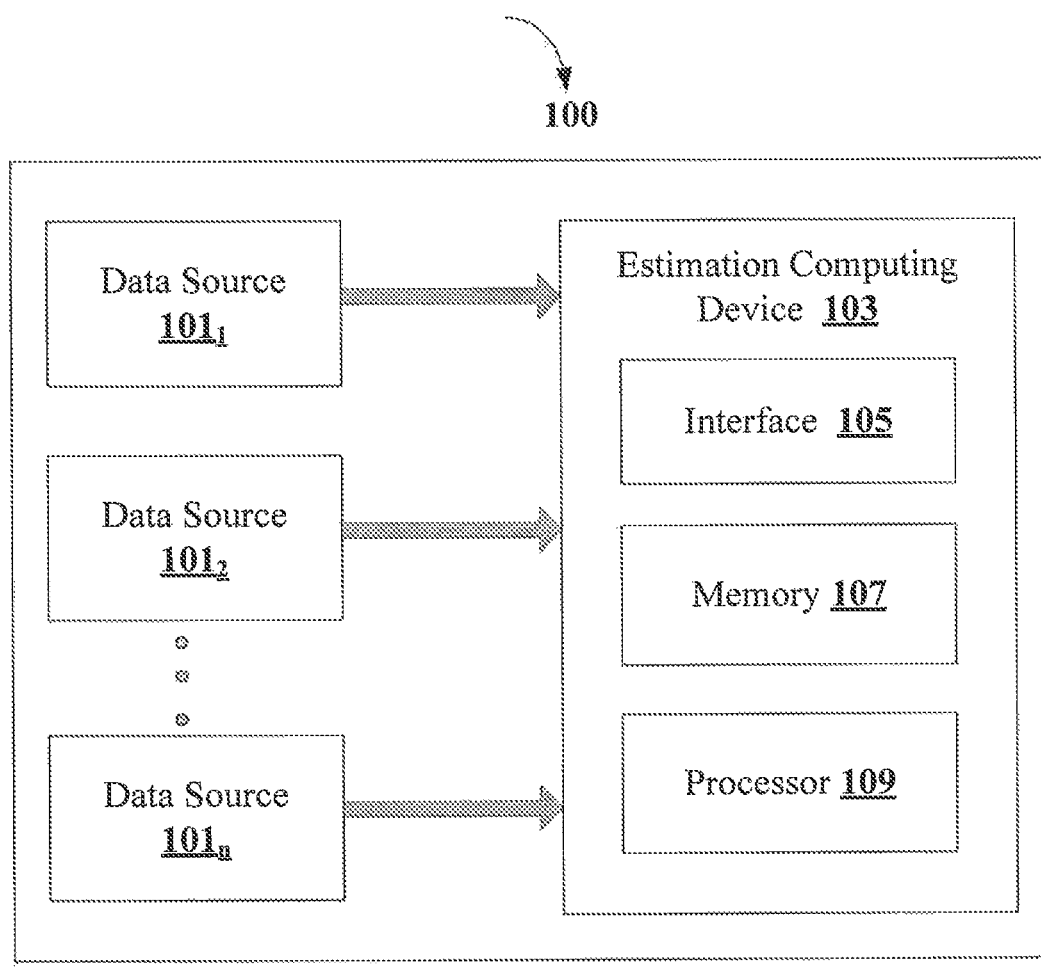
FIG. 1 shows an exemplary environment for estimating efficiency of an employee in accordance with some embodiments of the present disclosure.

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the spirit and the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

The present disclosure relates to a method and device for estimating efficiency of an employee of an organization. The method comprises receiving input data from one or more data sources, wherein the one or more data sources are classified into one of location data, vice data, video data and text data of the employee. The location data and video data are used to generate trajectory information of the employee. Then the trajectory information, the voice data and the text data are correlated to estimate efficiency of the employee. Consequently, real-time notifications are provided based on estimated efficiency of the employee.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

FIG. 1 shows an exemplary environment 100 for estimating efficiency of an employee in accordance with some embodiments of the present disclosure.

As shown in FIG. 1, the exemplary environment 100 comprises one or more data sources $101_1$, $101_2$ . . . , $101_n$ (collectively referred as 101) and an estimation computing device 103. The one or more data sources 101 are connected to the estimation computing device 103 through a communication network. The communication network may be a wireless network, wired network or a combination thereof. In one implementation, the one or more data sources 101 and the estimation computing device 103 are configured in an organization. The organization may refer to a place where many people/employees work. As an example, the organization may be an institution or an association. The one or more data sources 101 may include, but not limited to, video camera, e-mail database, recorded meeting database, employee swipe database and security systems. Examples of the security system may include, but are not limited to, biometric swipe capture machine, Radio Frequency Identification (RFID) machine and retina scanner. It may be understood by a person skilled in the art that any other third party surveillance system can be used with method of the present disclosure.

The estimation computing device 103 comprises an interface 105, a memory 107 and a processor 109. The interface 105 is coupled with the processor 109 through which input data are received from the one or more data sources 101. The memory 107 is communicatively coupled to the processor 109. The memory 107 stores processor executable instructions which on execution cause the estimation computing device 103 to estimate efficiency of the employee.

Figure 2:
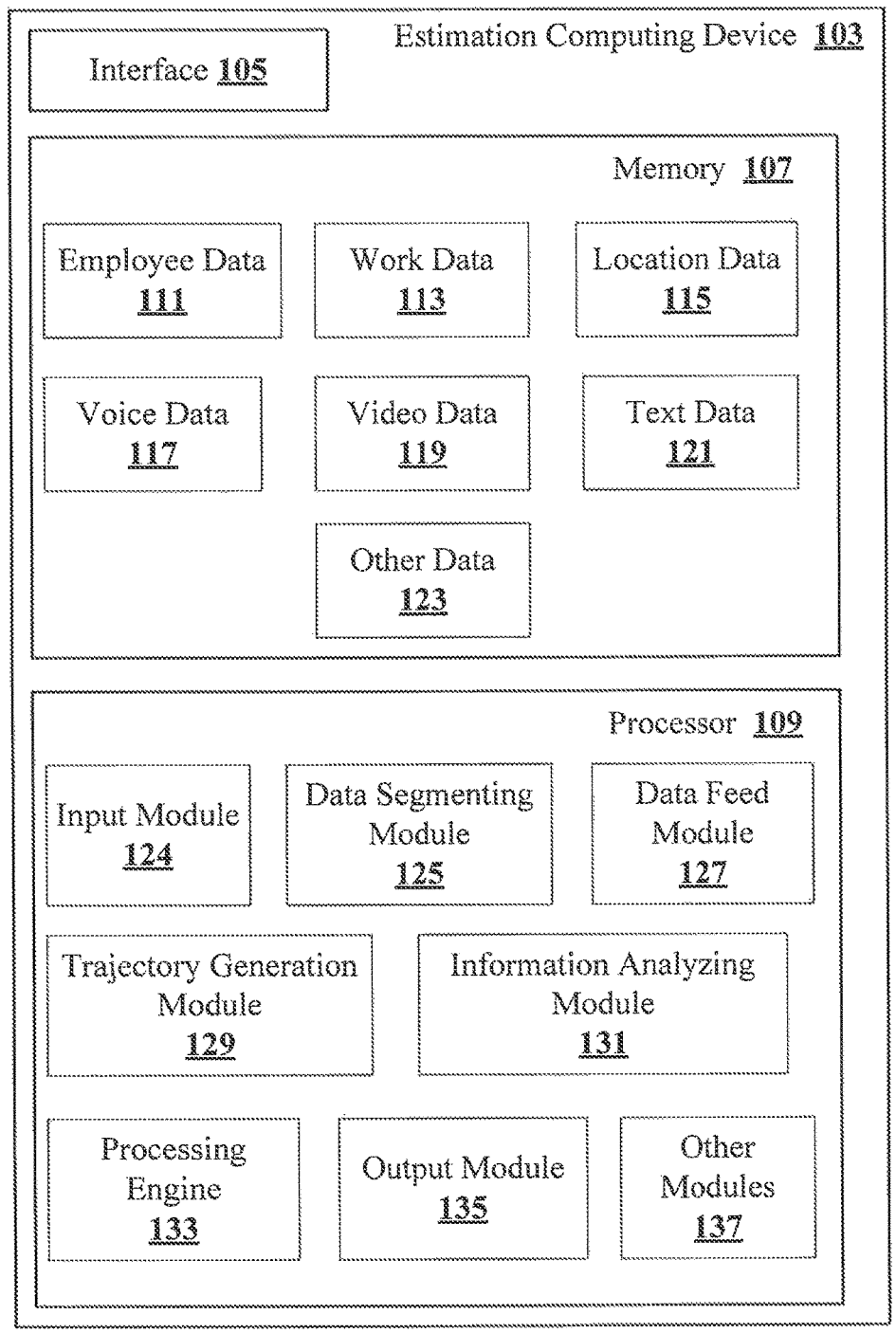
FIG. 2 shows a detailed block diagram illustrating an estimation computing device for estimating efficiency of an employee in accordance with some embodiments of the present disclosure.

FIG. 2 shows a detailed block diagram illustrating an estimation computing device for estimating efficiency of an employee in accordance with some embodiments of the present disclosure.

In one implementation, the estimation computing device 103 receives input data from the one or more data sources 101. As an example, the input data is stored within the memory 107. In an embodiment, the input data may include employee data 111, work data 113, location data 115, voice data 117, video data 119, text data 121 and other data 123.

In one embodiment, the input data may be stored in the memory 107 in the form of various data structures. Additionally, the aforementioned input data can be organized using data models, such as relational or hierarchical data models. The other data 123 may store data, including temporary data and temporary files, generated by modules for performing the various functions of the estimation computing device 103.

In an embodiment, the employee data 111 comprises information of each employee of the organization. As an example, the information may be name of the employee, date of joining the organization, number of work assigned to the employee and one or more reporting manager assigned to the employee. It may be understood by a person skilled in the art that any other information associated with employee refers to employee data 111.

In an embodiment, the work data 113 comprises information about work in the organization. As an example, the information may be amount of work in the organization, amount of completed works, works under progress and details of the works assigned to each employee in the organization.

In an embodiment, the location data 115 comprises information about location of the employees in the organization. The location of the employees may be identified using swipe database and video camera. The swipe database provides information of the office location of the employee. The video camera provides information of the movements of the employee in the office.

In an embodiment, the voice data 117 comprises information about meetings of the employee. The meetings may be in-person meetings or telephonic discussion. The meetings of the employee are recorded and stored in the recorded meetings database.

In an embodiment, the video data 119 comprises information about the location of the employee and the activities of the employee in the organization.

In an embodiment, the text data 121 comprises information of e-mail information, calendar information, login information, swipe information and resource information of the employee. The e-mail information includes e-mail communications of the employee. The calendar information includes one or more tasks assigned to the employee and one or more meetings scheduled for the employee. The login information includes network login details of the employee. The time at which the employee has logged in to the network and time spent on browsing the Internet. The swipe information provides login information of the employee in the organization i.e the time at which the employee has entered the organization, time at which the employee has left the organization and the location of the employee inside the office premises. The resource information includes information on usage of one or more resources in the organization. The one or more resources may include, but are not limited to, printer, telephone and scanner.

In an embodiment, the input data in the memory 107 is processed by the modules of the processor 109. The modules may be stored within the memory 107.

In one implementation, the modules may include, for example, an input module 124, a data segmenting module 125, a data feed module 127, a trajectory generation module 129, an information analyzing module 131, a processing engine 133, output module 135 and other modules 137. The estimation computing device 103 may also comprise other modules 137 to perform various miscellaneous functionalities of the estimation computing device 103. It will be appreciated that such aforementioned modules may be represented as a single module or a combination of different modules.

In an embodiment, the input module 124 receives input data from the one or more data sources 101 through the interface 105. The input module 124 is configured to convert the format of the received input data into a predefined format. For example, the input data from the video camera is in the form of video feeds. The input module 124 converts the video feeds into frames which are then processed by the estimation computing device 103.

In an embodiment, the data segmenting module 125 receives the input data from the input module 124 and classifies the input data into one of location data 115, voice data 117, video data 119, and text data 121. As an example, the input data from the video camera and the employee swipe data are classified as location data 115. The input data from the employee e-mail database are classified as text data 121 and the input data from the recorded meeting database is classified as voice data 117.

In an embodiment, the data feed module 127 is configured to provide the classified data into respective modules for further processing. In an embodiment, the location data 115 and the video data 119 is provided to the trajectory generation module 129 and the voice data 117 and the text data 121 are provided to the information analyzing module 131.

In an embodiment, the trajectory generation module 129 is configured to generate trajectory information of the employee using the location data 115 and the video data 119. The trajectory generation module 129 performs trajectory plotting on the video frames by identifying the employees face and the movement coordinates of the employee in the video frames. In an embodiment, the trajectory generation module 129 compares the trajectory information with the location data 115 of the employee received from the RFID machine database and the biometric swipe capturing machine for validating the location of the employee.

In an embodiment, the information analyzing module 131 is configured to analyze the voice data 117 and the text data 121. The voice data 117 is converted into text format for further processing by the estimation computing device 103. As an example, the voice data from the telephonic conversations, meetings are extracted by the information analyzing module 131 and converts the voice data 117 into text data 121 for further processing by the estimation computing device 103.

Figure 3A:
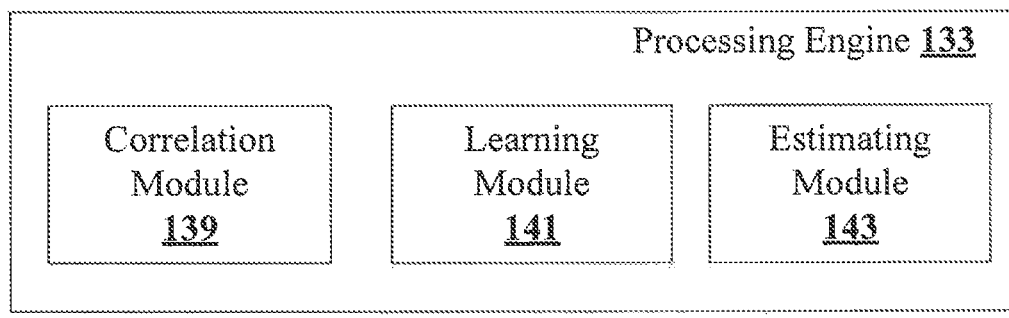
FIG. 3a shows a block diagram illustrating a processing engine in accordance with some embodiments of the present disclosure.

In an embodiment, the processing engine 133 comprises a correlation module 139, a learning module 141 and an estimating module 143. FIG. 3a shows a block diagram illustrating the processing engine 133 in accordance with some embodiments of the present disclosure. The correlation module 139 receives information of the employee and correlates the information to estimate efficiency of the employee. As an example, the correlation is performed using multi-dimensional collaborative model which in turn uses rule based learning models. A person skilled in the art should not that any other models can be used for performing the correlation of the input data. In one implementation, the information includes location of the employee, e-mail communications of the employee, calendar information, recorded meetings information, resource information, network login information, information from RFID machine, swipe information. As an example, the e-mail information is correlated with the video data 119 for determining whether the employee is attending the meeting or not. The meeting may be scheduled for a particular time and date and it is indicated in calendar of the employee. The correlation module 139 checks the video camera for the employee location to identify whether the employee is attending the meeting on the fixed date and time as per the calendar information. Similarly, if the employee is using the printer, the text in the print outs are checked with the work information. If the text is not related to the work, then the correlation module 139 ascertains that the printer has not been used for the work assigned to the employee. Further, if the employee has attended the meeting the voice of the employee is recorded. Once the voice of the employee is recorded, the correlation module 139 checks in the e-mail communications of the employee regarding the time schedule. The correlation module 139 determines the time specified in the e-mail communication and the meeting starting time in order to identify whether the employee attended the meeting or if the employee was late for the meeting etc.

As another example, the employee may be provided with a mobile for the work related communications. There may also be one or more telephones in the organization for telephonic discussions. The correlation module 139 compares the call logs of the mobile with the official contact list to check if the mobile has been used for the personal purpose.

In an embodiment, the learning module 141 is configured to analyze the feedback from the employee on the estimated efficiency of the employee. Based on the feedback, the learning module 141 identifies the parameters which led to incorrect predictions on the efficiency of the employee.

In an embodiment, the estimating module 143 is configured to estimate the efficiency of the employee based on the correlation of the input data. The estimation module 143 identifies the status of the work assigned to the employee. The timeline assigned to complete the work is compared with the timeline taken by the employee for completing the work. The estimation module 143 also receives information of the solutions provided by the employee for a problem faced during the work. The estimation module 143 also receives information of the resources used by the employee during the work to identify whether the resources has been used for the work related purpose or not. The estimation module 143 correlates the information of the meetings of the employee, time taken to complete the work by the employee, solutions provided by the employee for the problems in the work, resources used by the employee with the status of the work and estimate the efficiency of the employee.

Figure 3B:
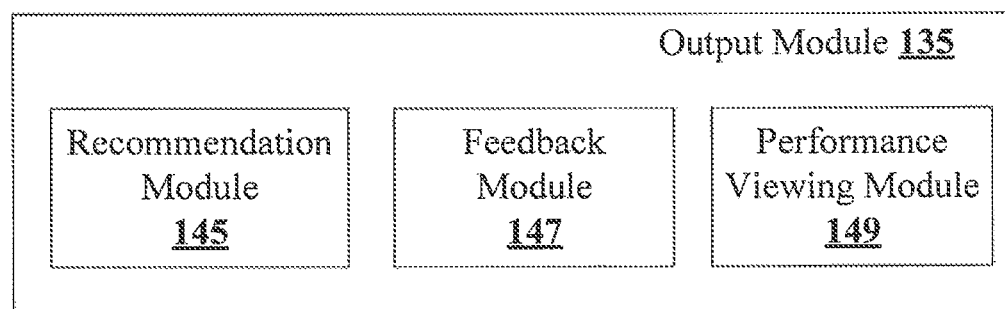
FIG. 3b shows a block diagram illustrating an output module in accordance with some embodiments of the present disclosure.

In an embodiment, the output module 135 comprises a recommendation module 145, a feedback module 147 and a performance viewing module 149. FIG. 3b shows a block diagram illustrating the output module 135 in accordance with some embodiments of the present disclosure.

In an embodiment, the recommendation module 145 is configured to provide one or more recommendations based on the estimated efficiency of the employee, the recommendation module 145 considers the information of resources used by the employee during the work, time spent on providing a solution for the problem in the work, total time spent on the work, time spent in browsing the internet, time spent in meetings, reasons for not completing the work within the timeline for providing one or more suggestions. The recommendation module 145 may recommend to the higher official of the employee, the efforts of the employee based on the estimated efficiency of the employee. The recommendations may also be provided to the employee to improve in few areas like providing more time to meetings. The recommendations may also be provided to the higher officials relating to the work, like dependency of the employee based on the estimated efficiency of the employee. For example, whether the employee should be considered for assigning any other important work or not if the estimated efficiency of the employee is too low. Further, the recommendation module 145 may also provide information to the higher officials of the employee about the discrepancies like employee spending more time in mobile for unofficial work. Accordingly, one or more suggestions are provided by the recommendation module 145 to the employee for using that time for some productive purpose like preparing a presentation.

In an embodiment, the recommendation module 145 may also provide recommendations to the reporting manager on the employees who are slow and are not able to complete the work within the timeline. Based on the recommendation, the higher officials may assign other employees for the work who have completed their work.

In an embodiment, the recommendation module may also provide recommendations to the reporting manager about the status of the work assigned to the employees based on the efficiency of the employees.

In an embodiment, the feedback module 147 is configured to receive feedback from employee or from the higher officials. As an example, the employee may provide the feedback to the higher official on the estimated efficiency of the employee. The employee may agree/disagree to the efficiency estimated for the employee. Based on the feedback from the employee, the estimation module may process the input data for re-estimating the efficiency of the employee.

In an embodiment, the performance view module 149 is configured to provide overall performance view of the employee. The performance viewing module 149 indicates one or more works of the employee which is completed well before the timeline. Accordingly, the employee is referred for appreciation or reward from the higher officials. The performance viewing module 149 also indicates one or more works of the employee which is not completed within the timeline and the reasons for not completing the one or more works. The reasons may be provided by the employee using the feedback module 147. Further, the performance viewing module 149 indicates the one or more resources used by the employee during the work and the resources which were misused by the employee.

Figure 4:
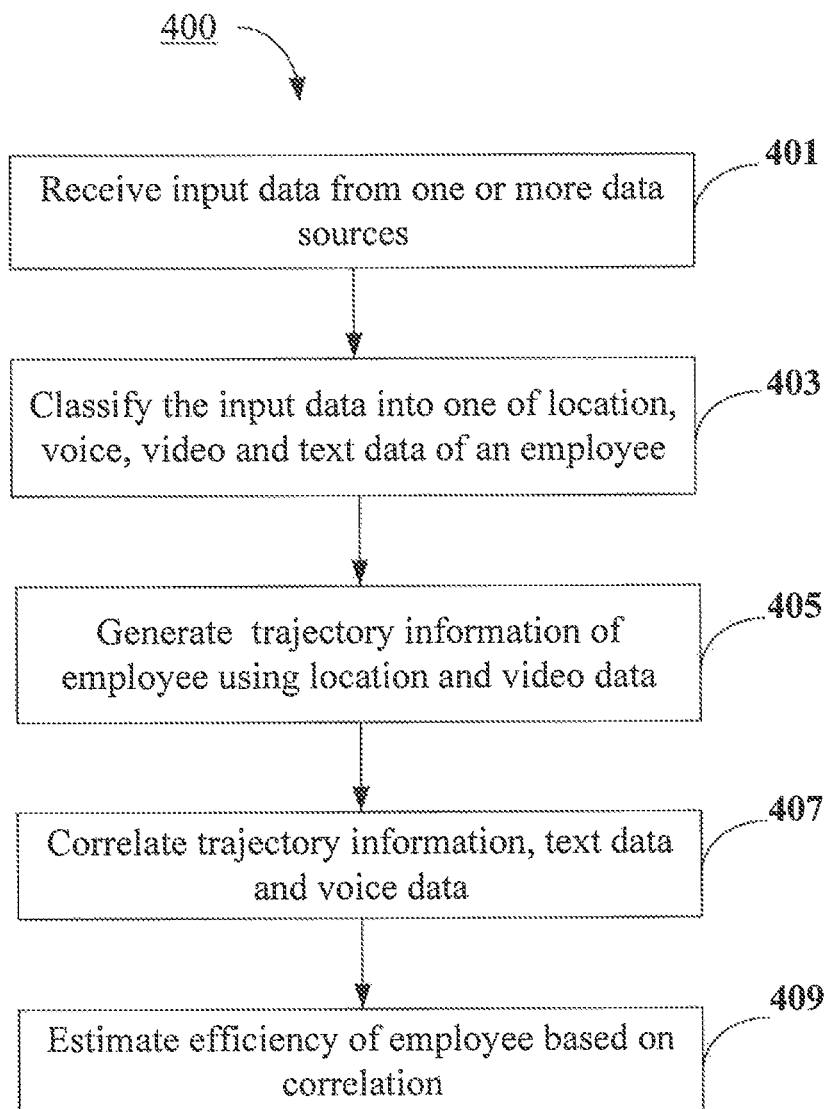
FIG. 4 illustrates a flowchart showing method for estimating efficiency of an employee organization in accordance with some embodiments of the present disclosure.

FIG. 4 illustrates a flowchart showing method for estimating efficiency of an employee organization in accordance with some embodiments of the present disclosure.

As illustrated in FIG. 4, the method 400 comprises one or more blocks for estimating efficiency of an employee of an organization by an estimation computing device 103. The method 400 may be described in the general context of computer executable instructions. Generally, computer executable instructions can include routines, programs, objects, components, data structures, procedures, modules, and functions, which perform particular functions or implement particular abstract data types.

The order in which the method 400 is described is not intended to be construed as a limitation, and any number of the described method blocks can be combined in any order to implement the method. Additionally, individual blocks may be deleted from the methods without departing from the spirit and scope of the subject matter described herein. Furthermore, the method can be implemented in any suitable hardware, software, firmware, or combination thereof.

At block 401, receive input data from one or more data sources 101. In an embodiment, the input module 124 of the estimation computing device 103 receives the input data from one or more data sources 101. The one or more data sources 101 are communicatively connected to the estimation computing device. The one or more data sources 101 are at least one of a video camera, recorded meeting database, e-mail database, swipe database and security systems. The input module 124 converts the format of the received input data into a predefined format. For example, the input data from the video camera is the video feeds. The video feeds are converted into frames which are processed by the estimation computing device.

At block 403, classify the input data of the employee. In an embodiment, the data segmenting module 125 of the estimation computing device 103 classifies the input data into one of location data 115, voice data 117, video data 119, and text data 121.

At block 405, the trajectory information of the employee is generated using the location data 115 and the video data 119. The trajectory generation module 129 of the estimation computing device 103 generates trajectory information of the employee using the location data 115 and the video data 119. The trajectory generation module 129 performs trajectory plotting on the video feed by identifying face of the employee and the movement coordinates of the employee in the video feed.

At block 407, the trajectory information, voice data 117 and the text data 121 of the employee are correlated. The correlation module 139 of the estimation computing device 103 receives information of the employee and correlates to estimate efficiency of the employee. In one implementation, the information includes location of the employee, e-mail communications of the employee, calendar information, recorded meetings information, resource information, network login information, information from RFID machine, swipe information.

At block 409, the efficiency of the employee is estimated based on correlation. The estimating module 143 of the estimation computing device 103 identifies the status of the work assigned to the employee. The timeline assigned to complete the work is compared with the timeline taken by the employee for completing the work. The estimation module also receives information of the solutions provided by the employee for a problem encountered during the work, the resources used by the employee during the work and the meetings attended by the employee. The estimating module 143 correlates the information of the meetings of the employee, time taken to complete the work by the employee, solutions provided by the employee for the problems in the work, resources used by the employee with the status of the work and estimate the efficiency of the employee.

In an embodiment, the recommendation module 145 provides one or more recommendations based on the estimated efficiency of the employee. The recommendation module 145 considers the information of resources used by the employee during the work, time spent on providing a solution for the problem in the work, total time spent on the work, time spent in browsing the internet, time spent in meetings, reasons for not completing the work within the timeline for providing one or more suggestions. The one or more suggestions may be provided to the employee to improve in few areas like providing more time to meetings. The suggestions may also be provided to the reporting manager relating to the work, like dependency of the employee based on the estimated efficiency of the employee.

In an embodiment, the overall performance of the employee is indicated in the performance view module 149. The performance viewing module 149 indicates one or more works of the employee which is completed well before the timeline. The performance viewing module 149 also indicates one or more works of the employee which is not completed within the timeline and the reasons for not completing the one or more works. The reasons may be provided by the employee using the feedback module 147. Further, the performance view module 149 indicates the one or more resources used by the employee during the work and the resources which were misused by the employee. Upon viewing the performance, the employee may provide feedback to the higher official on the estimated efficiency of the employee using the feedback module 147.

Figure 5:
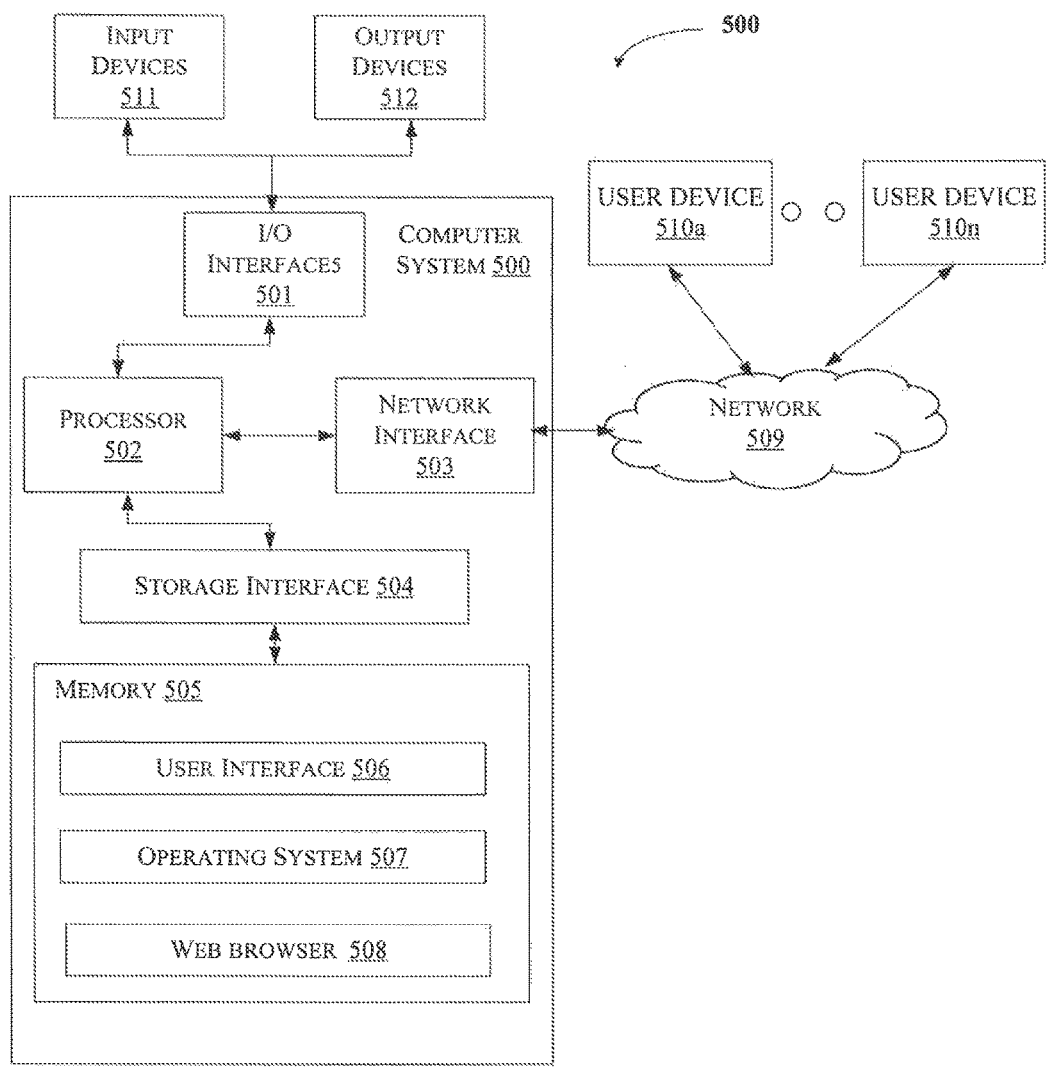
FIG. 5 illustrates a block diagram of an exemplary computer system for implementing embodiments consistent with the present disclosure.

FIG. 5 illustrates a block diagram of an exemplary computer system 500 for implementing embodiments consistent with the present invention. In an embodiment, the computer system 500 is used to estimate efficiency of an employee of an organization. The computer system 500 may comprise a central processing unit ("CPU" or "processor") 502. The processor 502 may comprise at least one data processor for executing program components for executing user- or system-generated business processes. A user may include a person, a person using a device such as such as those included in this invention, or such a device itself. The processor 502 may include specialized processing units such as integrated system (bus) controllers, memory management control units, floating point units, graphics processing units, digital signal processing units, etc.

The processor 502 may be disposed in communication with one or more input/output (I/O) devices (511 and 512) via I/O interface 501. The I/O interface 501 may employ communication protocols/methods such as, without limitation, audio, analog, digital, stereo, IEEE-1394, serial bus, Universal Serial Bus (USB), infrared, PS/2, BNC, coaxial, component, composite, Digital Visual Interface (DVI), high-definition multimedia interface (HDMI), Radio Frequency (RF) antennas, S-Video, Video Graphics Array (VGA), IEEE 802.n/b/g/n/x, Bluetooth, cellular (e.g., Code-Division Multiple Access (CDMA), High-Speed Packet Access (HSPA+), Global System For Mobile Communications (GSM), Long-Term Evolution (LTE), WiMax, or the like), etc.

Using the I/O interface 501, the computer system 500 may communicate with one or more I/O devices (511 and 512).

In some embodiments, the processor 502 may be disposed in communication with a communication network 509 via a network interface 503. The network interface 503 may communicate with the communication network 509. The network interface 503 may employ connection protocols including, without limitation, direct connect, Ethernet (e.g., twisted pair 10/100/1000 Base T), Transmission Control Protocol/Internet Protocol (TCP/IP), token ring, IEEE 802.11a/b/g/n/x, etc. Using the network interface 503 and the communication network 509, the computer system 500 may communicate with one or more user devices 510 (a, . . . , n). The communication network 509 can be implemented as one of the different types of networks, such as intranet or Local Area Network (LAN) and such within the organization. The communication network 509 may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the communication network 509 may include a variety of network devices, including routers, bridges, servers, computing devices, storage devices, etc. The one or more user devices 510 (a, . . . , n) may include, without limitation, personal computer(s), mobile devices such as cellular telephones, smartphones, tablet computers, eBook readers, laptop computers, notebooks, gaming consoles, or the like.

In some embodiments, the processor 502 may be disposed in communication with a memory 505 (e.g., RAM, ROM, etc. not shown in FIG. 5) via a storage interface 504. The storage interface 504 may connect to memory 505 including, without limitation, memory drives, removable disc drives, etc., employing connection protocols such as Serial Advanced Technology Attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 505 may store a collection of program or database components, including, without limitation, user interface application 506, an operating system 507, web server 508 etc. In some embodiments, computer system 500 may store user/application data 506, such as the data, variables, records, etc. as described in this invention. Such databases may be implemented as fault-tolerant, relational, scalable, secure databases such as Oracle or Sybase.

The operating system 507 may facilitate resource management and operation of the computer system 500. Examples of operating systems include, without limitation, Apple Macintosh OS X, UNIX, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), International Business Machines (IBM) OS/2, Microsoft Windows (XP, Vista/7/8, etc.), Apple iOS, Google Android, Blackberry Operating System (OS), or the like. User interface 506 may facilitate display, execution, interaction, manipulation, or operation of program components through textual or graphical facilities. For example, user interfaces may provide computer interaction interface elements on a display system operatively connected to the computer system 500, such as cursors, icons, check boxes, menus, scrollers, windows, widgets, etc. Graphical User Interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 500 may implement a web browser 508 stored program component. The web browser may be a hypertext viewing application, such as Microsoft Internet Explorer, Google Chrome, Mozilla Firefox, Apple Safari, etc. Secure web browsing may be provided using Secure Hypertext Transport Protocol (HTTPS) secure sockets layer (SSL), Transport Layer Security (TLS), etc. Web browsers may utilize facilities such as AJAX, DHTML, Adobe Flash, JavaScript, Java, Application Programming Interfaces (APIs), etc. In some embodiments, the computer system 500 may implement a mail server stored program component. The mail server may be an Internet mail server such as Microsoft Exchange, or the like. The mail server may utilize facilities such as Active Server Pages (ASP), ActiveX, American National Standards Institute (ANSI) C++/C#, Microsoft .NET, CGI scripts, Java, JavaScript, PERL, PHP, Python, WebObjects, etc. The mail server may utilize communication protocols such as Internet Message Access Protocol (IMAP), Messaging Application Programming Interface (MAPI), Microsoft Exchange, Post Office Protocol (POP), Simple Mail Transfer Protocol (SMTP), or the like. In some embodiments, the computer system 500 may implement a mail client stored program component. The mail client may be a mail viewing application, such as Apple Mail, Microsoft Entourage, Microsoft Outlook, Mozilla Thunderbird, etc.

Furthermore, one or more computer-readable storage media may be utilized in implementing embodiments consistent with the present invention. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., non-transitory. Examples include Random Access Memory (RAM), Read-Only Memory (ROM), volatile memory, nonvolatile memory, hard drives, Compact Disc (CD) ROMs, Digital Video Disc (DVDs), flash drives, disks, and any other known physical storage media.

In an embodiment, the present disclosure utilizes multiple activities of the employee in the organization for estimating efficiency of the employee.

In an embodiment, the present disclosure integrates information from multiple security systems along with the activities of the employee for estimating efficiency of the employee.

In an embodiment, the present disclosure considers the efforts of the employee during the work for estimating efficiency of the employee.

In an embodiment, the present disclosure provides recommendations to employee for improving work productivity. The recommendations are also provided to reporting manager in the organization about dependency of the employee based on the estimated efficiency.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

REFERRAL NUMERALS

| Reference Number | Description |
| --- | --- |
| 100 | Environment |
| 101 | Data Source |
| 103 | Estimation Computing Device |
| 105 | Interface |
| 107 | Memory |
| 109 | Processor |
| 111 | Employee Data |
| 113 | Work Data |
| 115 | Location Data |
| 117 | Video Data |
| 119 | Voice Data |

-continued

| Reference Number | Description |
| --- | --- |
| 121 | Text Data |
| 123 | Other Data |
| 124 | Input Module |
| 125 | Data Segmenting Module |
| 127 | Data Feed Module |
| 129 | Trajectory Generating Module |
| 131 | Information Analyzing Module |
| 133 | Processing Engine |
| 135 | Output Module |
| 137 | Other Modules |
| 139 | Correlation Module |
| 141 | Learning Module |
| 143 | Estimating Module |
| 145 | Recommendation Module |
| 147 | Feedback Module |
| 149 | Performance Viewing Module |

We claim:

1. A method for estimating efficiency of an employee of an organization, the method comprising:
receiving, by an estimation computing device, input data from a plurality of data sources;
converting, by the estimation computing device, the received input data into a pre-defined format;
classifying, by the estimation computing device, the converted input data into one or more of location data, video data, voice data, and text data relating to the employee, forming, at least in part, formatted voice data and formatted video data;
identifying, by the estimation computing device, the employee based on at least one of the formatted voice data and the formatted video data;
generating, by the estimation computing device, a trajectory information of the employee using at least the location data and the video data;
correlating, by the estimation computing device, the trajectory information, the voice data and the text data relating to the employee;
estimating, by the estimation computing device, an efficiency of the employee based on the correlation and generating recommendations based on the estimated efficiency;
responsive to determining that the estimated efficiency is less than a predefined efficiency limit, providing, by an output device, the estimated efficiency of the employee and recommendations based on the estimated efficiency to a supervisor of the employee;
receiving, by an input device, user feedback on the estimated efficiency and the recommendations; and
applying, by the estimation computing device, learning models to update the efficiency estimate and recommendations based on the user feedback.

2. The method as claimed in claim 1, wherein the plurality of data sources comprises a video camera, an e-mail database, recorded meeting database, employee swipe database, and security systems.

3. The method as claimed in claim 1, wherein the text data includes at least one of e-mail information, calendar information, login information, swipe information and resource information.

4. The method as claimed in claim 1, wherein the voice data includes information about meetings of the employee.

5. The method as claimed in claim 1, wherein the estimated efficiency of the employee provides one or more information comprising amount of time spent on a work assigned to the employee, one or more resources used by the employee for completing the work, preparing presentations for the work and time spent in a meeting.

6. The method as claimed in claim 1, wherein using the formatted video data further comprises identifying a face of the employee and movement coordinates of the employee in the formatted video data.

7. An estimation computing device for estimating efficiency of an employee of an organization, comprising:
a processor; and
a memory communicatively coupled to the processor, wherein the memory stores processor-executable instructions, which, on execution, causes the processor to:
receive input data from a plurality of data sources;
convert the received input data into a pre-defined format;
classify the converted input data into one or more of location data, video data, voice data, and text data relating to the employee, forming, at least in part, formatted voice data and formatted video data;
identify the employee based on at least one of the formatted voice data and the formatted video data;
generate a trajectory information of the employee using at least the location data and the video data;
correlate the trajectory information, the voice data and the text data relating to the employee;
estimate an efficiency of the employee based on the correlation and generate recommendations based on the estimated efficiency;
responsive to determining that the estimated efficiency is less than a predefined efficiency limit, provide recommendations based on the estimated efficiency of the employee;
receive user feedback on the estimated efficiency and the recommendations; and
apply learning models to update the efficiency estimate and recommendations based on the user feedback.

8. The estimation computing device as claimed in claim 7, wherein the estimated efficiency of the employee provides one or more information comprising amount of time spent on a work assigned to the employee, one or more resources used by the employee for completing the work, preparing presentations for the work and time spent in a meeting.

9. The estimation computing device as claimed in claim 7, wherein the plurality of data sources comprises a video camera, an e-mail database, recorded meeting database, employee swipe database and security systems.

10. The estimation computing device as claimed in claim 7, wherein the text data includes at least one of e-mail information, calendar information, login information, swipe information and resource information.

11. The estimation computing device as claimed in claim 7, wherein the voice data includes information about meetings of the employee.

12. The estimation computing device as claimed in claim 7, wherein using the formatted video data further comprises identifying a face of the employee and movement coordinates of the employee in the formatted video data.

13. A non-transitory computer readable medium including instructions stored thereon that when processed by at least one processor cause an estimation computing device to perform operations comprising:
receiving input data from a plurality of data sources;
converting the received input data into a pre-defined format;
classifying the converted input data into one or more of location data, video data, voice data, and text data relating to the employee, forming, at least in part, formatted voice data and formatted video data;
identifying the employee based on at least one of the formatted voice data and the formatted video data;
generating a trajectory information of the employee using at least the location data and the video data;
correlating the trajectory information, the voice data and the text data relating to the employee;
estimating an efficiency of the employee based on the correlation and generate recommendations based on the estimated efficiency;
responsive to determining that the estimated efficiency is less than a predefined efficiency limit, providing the estimated efficiency of the employee and recommendations based on the estimated efficiency;
receiving user feedback on the estimated efficiency and the recommendations; and
applying learning models to update the efficiency estimate and recommendations based on the user feedback.

14. The medium as claimed in claim 13, wherein the instructions further cause the at least one processor to provide a notification based on the estimated efficiency of the employee, wherein the notification includes information of at least one of successful completion of the work by the employee, incomplete work by the employee and misuse of one or more resources by the employee.

15. The medium as claimed in claim 13, wherein the text data includes at least one of e-mail information, calendar information, login information, swipe information and resource information.

16. The medium as claimed in claim 13, wherein the voice data includes information about meetings of the employee.

17. The medium as claimed in claim 13, wherein using the formatted video data further comprises identifying a face of the employee and movement coordinates of the employee in the formatted video data.

* * * * *